Sept. 7, 1937.　　　　　C. C. FARMER　　　　　2,092,415
BRAKE CONTROL MECHANISM
Filed Jan. 10, 1936
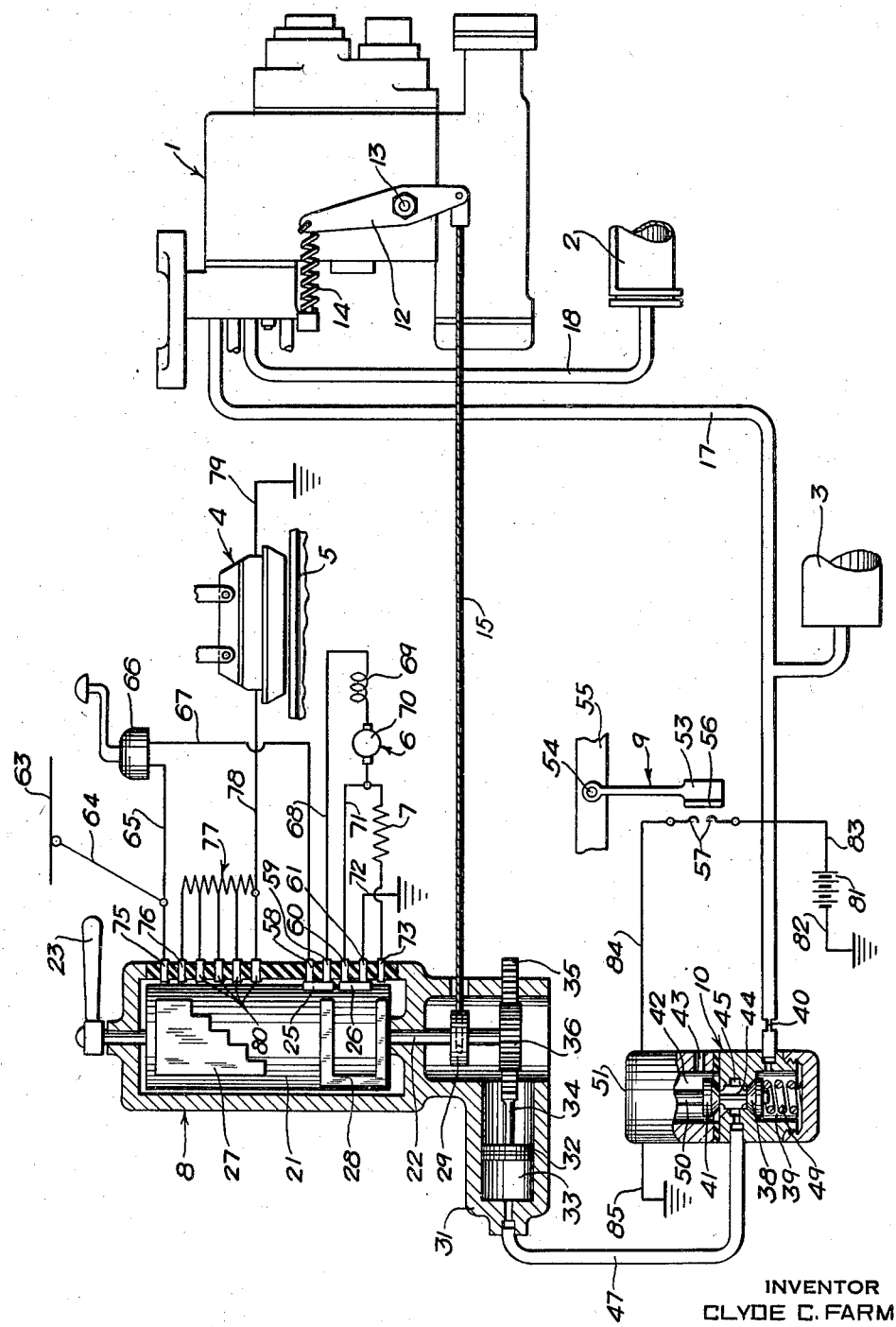
INVENTOR
CLYDE C. FARMER
BY Wm. M. Cady
ATTORNEY Patented Sept. 7, 1937

2,092,415

UNITED STATES PATENT OFFICE 2,092,415

BRAKE CONTROL MECHANISM

Clyde C. Farmer, Pittsburgh, Pa., assignor to The Westinghouse Air Brake Company, Wilmerding, Pa., a corporation of Pennsylvania Application January 10, 1936, Serial No. 58,487

6 Claims. (Cl. 303—3)

This invention relates to brake equipment for vehicles and more particularly to brake controlling means for automatically controlling the degree of application of the brakes.

It has heretofore been proposed to provide brake equipment for vehicles designed for modern high speed service having a manually operable controller for governing the operation of brake control mechanism to cause an application of the brakes to a degree dependent upon the amount of movement of the manually operable device from its release position, and to provide a retardation controller device responsive to the rate of retardation of the vehicle for also governing the operation of the brake control mechanism to limit the degree of application of the brakes independently of the position of the manually operable controller to limit the rate of retardation of the vehicle to a desired value. In such a brake system the control of the brakes is taken from the operator by the retardation controller device to the extent that may be necessary in order to limit the degree of application of the brakes to a value corresponding to the rate of retardation of the vehicle for which the retardation controller device is set.

Under some conditions it is desirable that the operator be able to maintain control of the brakes independently of the operation of the retardation control device, that is, that the retardation controller shall not be capable of intercepting the braking demand called for by the position of the brake controller handle against the will of the operator.

It is an object of my invention to provide, in a brake equipment of the above indicated character, means responsive to a retardation controller device for controlling the degree of application of the brakes through operation of the manually operable controller.

It is another object of my invention to provide a brake equipment of the above indicated character in which the operator will be aware of the retardation controller becoming effective to control the brakes, and in which he may, if he desires, resist the taking over of the control of the brakes by the retardation controller.

Other objects and advantages of my invention will be apparent from the following description of one preferred embodiment thereof when read with reference to the accompanying drawing, in which the single figure is a diagrammatic view, partly in section, of a brake system embodying my invention.

As shown in the drawing, the brake system may include a fluid pressure brake equipment comprising a self-lapping brake valve device 1, a brake cylinder 2, and a main reservoir 3, a magnetic track brake comprising a track shoe 4 adapted to engage the rail 5, and dynamic braking equipment comprising a vehicle driving motor 6 adapted to operate as an electric generator for supplying current to a dynamic braking resistor 7. A manually operable braking controller 8 is provided for controlling the operation of the brake system, and a retardation controller 9 and a magnet valve device 10 are provided for regulating the degree of application of the brakes to limit the rate of retardation of the vehicle to a predetermined value.

The self-lapping brake valve device 1 may be of any suitable type, and for the purpose of illustration is shown in outline form as similar to the type disclosed in the United States Patent No. 2,012,747 of John W. Logan, Jr. (see Figs. 1 and 2). The brake valve device 1 is provided with an operating lever 12 attached to a rotatable shaft 13, said lever being connected at its upper end to a spring 14 and at its lower end to a cable 15. When the lever 12 is turned in a clockwise direction the brake valve device is operative to supply fluid under pressure from the main reservoir 3 through a pipe 17 and a pipe 18 to the brake cylinder 2, and when the spring 14 is permitted to move said lever in the opposite direction said device is operative to release fluid under pressure from the brake cylinder.

The braking controller 8 comprises a casing containing a rotatable drum 21, which drum is secured to an axially disposed shaft 22 suitably journaled in the casing. The drum 21 is adapted to be manually operated by means of a handle 23 secured to the upper end of the shaft 22.

Conducting segments 25, 26, 27 and 28 are mounted on the drum 21. The conducting segments 25 and 26 are adapted to control the supply of power to the driving motor 6, the conducting segment 27 is adapted to control the supply of current to the winding of the track shoe 4, and the conducting segment 28 is adapted to control operation of the motor 6 as a dynamic brake. Secured to the shaft 22 below the drum 21 is a member 29, to which is attached the end of the cable 15 for operating the brake valve device, said member 29 being adapted to pull the cable to the left when the braking controller 8 is moved toward an application position.

Contained in a cylinder portion 31 of the braking controller casing is a piston 32 which has at one side a piston chamber 33. The piston carries a stem 34 provided with a rack 35 having teeth adapted to mesh with the teeth of a pinion 36, which pinion is secured to the lower end of the rotatable shaft 22 of the braking controller 8.

The magnet valve device 10 comprises a casing containing a supply valve 38 and a vent valve 41, said supply valve 38 being disposed in a valve chamber 39 connected through a choke fitting having a restricted passage 40 to the main reservoir pipe 17, and said vent valve 41 being disposed in a chamber 42 open to the atmosphere through a passage 43. The valves 38 and 41 are connected together by a fluted stem 44 and are adapted to control the supply and release of fluid under pressure through a bore 45 in which said stem is guided, which bore is open through a pipe 47 to the chamber 33 in the braking controller 8. A stem 50 is provided on the vent valve 41, and is secured to an armature adapted to be actuated by a magnet 51 when energized for seating the valve 41 and unseating the valve 38, the movement of the valves being opposed by a spring 49 contained in the chamber 39, which spring acts against the supply valve 38 for normally maintaining said valve 38 seated and vent valve 41 unseated.

The retardation controller 9 may be of any suitable type, and as shown in diagrammatic form in the drawing comprises a pendulum 53, which is pivotally supported by a pin 54 secured to a support member 55, and which carries a contact plate 56, suitable insulating means being interposed between said plate and the pendulum. The pendulum 53 is so mounted on the vehicle as to be swung to the left in accordance with the inertia effect set up during deceleration of the vehicle when the brakes are applied, the contact plate 56 being adapted to bridge a pair of stationary contacts 57 when the rate of retardation of the vehicle exceeds a given rate.

In operation, with the braking controller 8 in the release position, as shown in the drawing, the contact segment 25 on the drum 21 bridges contact fingers 58 and 59, while the contact segment 26 bridges contact fingers 60 and 61, thus bridging a link in a circuit that is controlled by the controller 66 for supplying current to the driving motor 6, the circuit being from the overhead conductor 63, through trolley 64, conductor 65, motorman's controller 66, conductor 67, contact finger 58, contact segment 25, contact finger 59, conductor 68, the field and armature windings 69 and 70 of the motor, conductor 71, contact finger 60, contact segment 26, contact finger 61 and grounded conductor 72.

If it is desired to apply the brakes, the braking controller 8 is moved out of the release position through the medium of the handle 23, the initial movement serving to disengage the contact segments 25 and 26 from the contact fingers 58, 59, 60 and 61, thereby interrupting the circuit through which current is normally supplied to the motor 6. As the braking controller is moved into the application zone to a degree according to the desired degree of braking, the member 29 is turned so as to pull the cable 15 to the left, turning the lever 12 of the self-lapping brake valve device 1 in a clockwise direction for supplying fluid under pressure from the main reservoir 3 to the brake cylinder 2 to effect an initial application of the fluid pressure brake.

At substantially the same time, the contact segment 28 on the drum 21 is moved so as to connect the contact finger 59 with a contact finger 73, thus completing a dynamic braking circuit from one terminal of the armature winding 70, through the field winding 69, conductor 68, contact finger 59, contact segment 28, contact finger 73 and the dynamic braking resistor 7 to the other terminal of the armature winding.

As the braking controller 8 is thus moved into the application zone, the contact segment 27 bridges two contact fingers 75 and 76. A circuit is then completed for energizing the windings of the track shoe 4, the energizing circuit being from the overhead conductor 63, to the trolley 64, through the conductor 65, the connected contact fingers 75 and 76, a resistance element 77, a conductor 78, the track shoe 4 and grounded conductor 79. The resistance element 77 is provided with contact fingers 80 which are adapted to be successively engaged by the contact segment 27, upon further movement of the drum 21 into the application zone, for gradually shunting out the resistance 77 and increasing the current supplied to the track shoe.

As the application of the brakes initiated as just described becomes effective, the pendulum 53 of the retardation controller 9 is urged to the left due to the force of inertia set up upon deceleration of the vehicle. If the amount of movement of the controller handle 23 is enough to cause the brakes to be applied with sufficient force to cause the predetermined rate of retardation of the vehicle for which the retardation controller is set, the pendulum 9 will be moved by inertia to the left sufficiently to cause engagement of the contact plate 56 with the contact members 57 to complete a circuit for energizing the magnet 51 of the magnet valve device 10, said circuit extending from the positive terminal of the battery 81 through the conductor 83, contact members 56 and 57, conductor 84, the coil of the magnet 51, and the grounded conductor 85, to the grounded battery terminal 82.

Energization of the magnet 51 causes the stem 50 to be moved by the armature of the magnet 51, so as to close the vent valve 41 and unseat the supply valve 38. Fluid under pressure is then supplied at a predetermined rate from the main reservoir 3 through the pipe 17 and the restricted passage 40 to the valve chamber 39 of the magnet valve device, and thence past the unseated valve 38, and through the bore 45 and pipe 47 to the piston chamber 33 in the braking controller 8. The pressure of fluid in chamber 33 then gradually moves the piston 32 to the right, causing the rack 35 to rotate the pinion 36 and shaft 22 so as to turn the member 29 and the drum 21 toward the release position.

The member 29 in turning toward release position lessens the tension on the cable 15 so that the spring 14 of the self-lapping brake valve device 1 is permitted to move the lever 12 in a counter-clockwise direction, thereby operating said brake valve device to effect a release of fluid under pressure from the brake cylinder 2. At the same time the turning of the drum 21 toward release position disengages the contact segment 27 successively from the contact fingers 80 so as gradually to connect resistance element 77 into the track brake circuit for reducing the supply of current to the track shoe 4. The above described automatic operation of the braking controller 8 is thus effective to release the brakes so as to reduce the rate of retardation of the vehicle.

The operator will, however, be aware of the control of the brakes by the retardation controller by the movement of the controller handle 23, and may, if he so desires, prevent the retardation controller from moving the controller drum in a direction to decrease the braking force, by applying a sufficient force to the handle 23 to overcome the force applied by the piston 32 and rack 35. Thus the retardation controller is prevented from taking the control of the brakes away from the operator without his consent.

When the rate of retardation of the vehicle is reduced by the above described partial release of the brakes sufficiently to permit the pendulum 53 of the retardation controller 9 to move out of engagement with the contacts 57, the magnet 51 of the magnet valve device will be deenergized, allowing the spring 49 to seat the supply valve 38 and to unseat the vent valve 41. Fluid under pressure will then be vented from the chamber 33 in the braking controller 8 by way of the pipe 47, bore 45, past the unseated valve 41 and through chamber 42 and passage 43 to the atmosphere. Further automatic movement of the braking controller 8 is thus stopped, permitting the brakes to be freely controlled by the operator, who may, if he so desires, again operate the handle 23 to effect another application of the brakes.

It will thus be seen that my invention provides means controlled by the retardation controller, in accordance with the rate of retardation of the vehicle, operative to regulate the degree of application of the brakes by adjusting the position of the braking controller, thereby dispensing with the necessity for providing intermediate brake control mechanism that may be governed either by the manually operable controller or by the retardation controller, depending upon which controller is effective to produce the lesser rate of retardation of the vehicle. In addition to the structural simplification of the equipment employed, my invention permits the operator to retain control of the brakes as against the contrary influence of the retardation controller, when such control is deemed necessary.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle braking system, in combination, an electrically controlled braking means, a brake valve device for controlling a fluid pressure brake, a manually movable braking controller operable to control said electrically controlled braking means, and operatively connected to said brake valve device to operate said brake valve device upon movement thereof, fluid pressure controlled means for effecting the operation of said braking controller, and means controlled according to the rate of retardation of the vehicle for varying the fluid pressure on said fluid pressure controlled means.

2. In a brake equipment for vehicles, in combination, braking means, a manually operable brake controller for effecting the operation of said braking means to apply the brakes in accordance with the amount of movement thereof from its release position, a retardation controller responsive to the rate of deceleration of the vehicle, and means controlled thereby and effective upon a predetermined rate of retardation of the vehicle for actuating said manually operable brake controller to decrease the degree of application of said braking means.

3. In a brake equipment for vehicles, in combination, braking means, a brake controller for effecting the operation of said braking means to apply the brakes in accordance with the amount of movement thereof from its release position, biasing means for constantly urging said controller toward its release position, manual means for actuating said controller from its release position to effect an application of the brakes, pneumatic means for biasing said controller toward its release position, and a retardation controller responsive to the rate of deceleration of the vehicle and operative upon a predetermined rate of retardation of the vehicle for rendering said pneumatic means effective.

4. In a brake equipment for vehicles, in combination, braking means, a brake controller for effecting the operation of said braking means to apply the brakes in accordance with the amount of movement thereof from its release position, biasing means for constantly urging said controller toward its release position, manual means for actuating said controller from its release position to effect an application of the brakes, and means for limiting the degree of application of the brakes comprising a retardation controller responsive to the rate of retardation of the vehicle and fluid pressure means controlled thereby for biasing said controller toward release position upon a predetermined rate of retardation of the vehicle.

5. In a brake equipment for vehicles, in combination, braking means, a braking controller operative to control the braking means, a retardation controller responsive to the rate of retardation of the vehicle, fluid pressure means controlled by said retardation controller for operating said braking controller, and manually operated means for actuating said braking controller and operable to resist operation of said braking controller by said fluid pressure means.

6. In a vehicle brake system, in combination, braking means, a braking controller adapted to effect the operation of said braking means to apply the brakes in accordance with the amount of movement thereof from its release position, fluid pressure controlled means adapted to bias said braking controller toward its release position, a retardation controller device operated according to the rate of retardation of the vehicle for varying the fluid pressure on said fluid pressure controlled means, and manually operated means operable to effect movement of said braking controller from its release position against the opposition of said fluid pressure controlled means.

CLYDE C. FARMER.